June 4, 1940. D. MOODY ET AL 2,203,284
METERING PLUG
Filed July 7, 1938
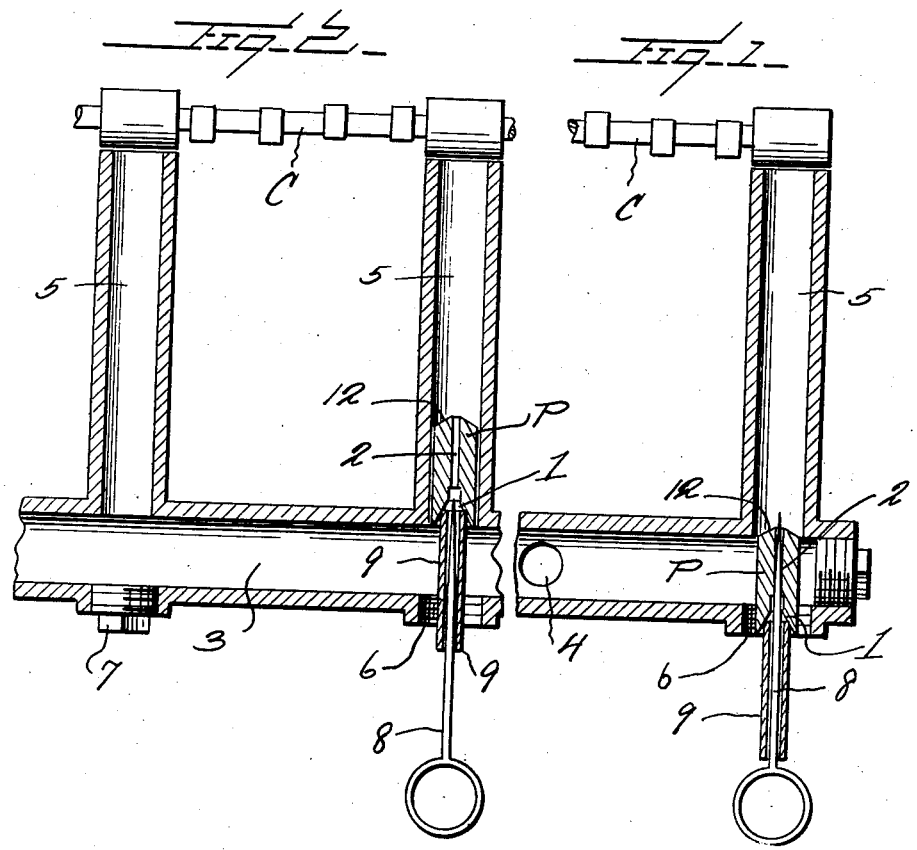
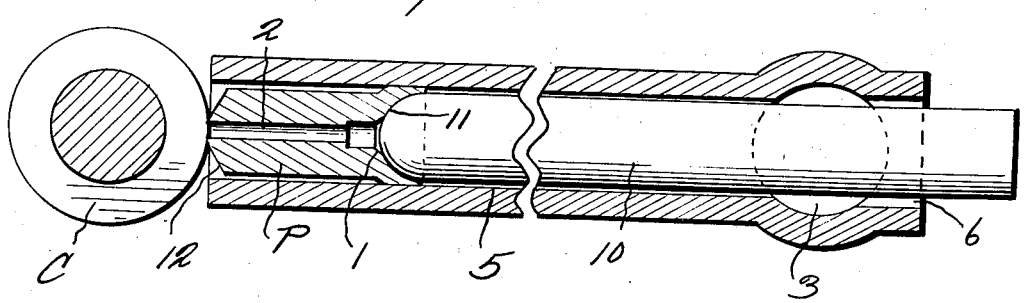
Inventors
D. Moody
R. E. Moody
By Watson E. Coleman
Attorney Patented June 4, 1940

2,203,284

UNITED STATES PATENT OFFICE 2,203,284

METERING PLUG

Dwight Moody and Ralph E. Moody, Arkansas City, Kans.

Application July 7, 1938, Serial No. 218,038

2 Claims. (Cl. 138—44)

This invention relates to a metering plug, and it is primarily an object of the invention to provide a metering plug to be applied within a feeder line for the cam shaft of an internal combustion engine to provide an effective regulation of the flow of the oil.

Another object of the invention is to provide a metering plug so constructed as to allow for expansion of a portion of such plug after being properly placed together with means to effect such expansion.

The invention consists in the details of construction and in the combination and arrangement of the several parts of our improved metering plug and means for placing the same whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:

Figure 1 is a diagrammatic view partly in section and partly in plan showing an initial assembly in placing a metering plug in accordance with our invention;

Figure 2 is a view similar to Figure 1 showing a further assembly;

Figure 3 is a view partly in section and partly in side elevation illustrating the final assembly in placing the plug.

Our improved plug P as herein disclosed is preferably not less than one-half inch in length and is also preferably made of drawn brass with the rear end formed to provide a substantially conical pocket or recess 1, the apex of which is inwardly disposed and continued by a center hole or port 2 of a relatively small diameter as determined by the discharge of oil desired.

In the accompanying drawing, there is diagrammatically illustrated an oiling system for a cam shaft C of an internal combustion engine and which system includes a main oil line 3 in proper communication, as at 4, with an oil pump and which main line 3 also has in communication therewith the feeder lines 5 terminating in close proximity to the cam shaft C. To effect the desired regulation of the flow of the oil out through the feeder lines 5, a plug P is positioned at the delivery end of each of said feeder lines 5 and in contact with the shaft C.

The main line 3 in alignment with each of the feeder lines 5 is provided with an opening 6 normally closed by a plug 7. The opening 6 is of a size to readily allow for the insertion of a plug P therethrough for placement within a feeder line 5.

In applying a plug P an elongated pointed shank or pin 8 is inserted through a sleeve 9 of desired length and engaged within the plug P through the lower end thereof or that end portion provided with the pocket 1. The sleeve 9 is of a diameter to also be readily insertible through the opening and of a sufficient length to allow said sleeve to be used to shift the plug P into a feeder line 5. The sleeve 9 is also used to hold the plug P within a feeder line 5 while the pin 8 is being removed so that during such operation the plug P will not fall into the main oil line 3. The sleeve 9 is then removed leaving the plug P within a feeder line 5 with the outer end of the plug P substantially coplanar with the adjacent outer end of the feeder line.

An end portion of an elongated mandrel 10 is then inserted through the opening 6, the inserted extremity 11 of the mandrel being preferably rounded. This rounded portion 11 of the mandrel 10 is partially received within the pocket or recess 1 of the plug P and the mandrel 10 is of a length to allow the same to push the plug along the feeder line 5 into contact with the shaft C. This mandrel 10 is also of a length to extend exteriorly of the main line 3 after the plug has been placed against the shaft C so that the outer end of the mandrel 10 may be impacted by a hammer or other suitable tool to expand the outer end portion of the plug P or that portion provided with the pocket or recess 1 so that such portion of the plug is caused to tightly fit within the feeder line 5 and thus be effectively maintained in its desired position. It is also preferrd that the delivery end portion of the plug P be tapered, as at 12, to provide for minimum of contact with the shaft C.

After the plug P has been properly placed in position the mandrel 10 is withdrawn and the plug 7 replaced. The plug P is in no sense a nozzle for a flow meter or intended as a medium of lowering pressures from one pressure to another. It often occurs that when grit gets into a lubricating line it cuts and the oil pressure carried to cam bearings cuts a groove to the outside of bearings which keeps enlarging and eventually leaks so bad that the pump is incapable of building up enough pressure. By the use of our plug P the leak is stopped and the applied plug holds back the oil so that it has to be forced out through the main oil line 3 with, of course, sufficient lubricant passing out through the center hole or port 2 of the applied plug P for lubricating the cam shaft.

From the foregoing description it is thought to be obvious that a metering plug constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. As a new article of manufacture, a plug for placement within the delivery end of a feeder line of an oiling system and having a restricted opening disposed axially therethrough, the inner portion of the plug being expansible into tight contact with the internal wall of the feeder line, the outer end of the applied plug to be substantially coplanar with the outer end of the feeder line.

2. As a new article of manufacture, a plug for placement within the delivery end of a feeder line of an oiling system and having a restricted opening disposed axially therethrough, the inner portion of the plug being expansible into tight contact with the internal wall of the feeder line, the outer end of the applied plug to be substantially coplanar with the outer end of the feeder line, the outer end portion of the plug being tapered.

DWIGHT MOODY.
RALPH E. MOODY.